(12) United States Patent
Park et al.

(10) Patent No.: US 12,309,519 B2
(45) Date of Patent: May 20, 2025

(54) READOUT CIRCUIT FOR REDUCING NOISE IN ANALOG-TO-DIGITAL CONVERTERS AND IMAGE SENSING DEVICE INCLUDING THE SAME

(71) Applicant: SK hynix Inc., Gyeonggi-do (KR)

(72) Inventors: Han Sol Park, Gyeonggi-do (KR); Shin Hoo Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/419,552

(22) Filed: Jan. 23, 2024

(65) Prior Publication Data

US 2025/0071448 A1    Feb. 27, 2025

(30) Foreign Application Priority Data

Aug. 24, 2023 (KR) .................. 10-2023-0111033

(51) Int. Cl.
*H04N 25/78* (2023.01)
*H04N 25/772* (2023.01)

(52) U.S. Cl.
CPC .......... *H04N 25/78* (2023.01); *H04N 25/772* (2023.01)

(58) Field of Classification Search
CPC ............................. H04N 25/78; H04N 25/772
See application file for complete search history.

(56) References Cited

U.S. PATENT DOCUMENTS

| | | | | |
|---|---|---|---|---|
| 2006/0244855 A1* | 11/2006 | Bock | ...................... | H04N 25/00 348/E3.018 |
| 2013/0062503 A1* | 3/2013 | Saito | ...................... | H03M 1/08 250/208.1 |
| 2014/0070974 A1* | 3/2014 | Park | ...................... | H04N 25/621 341/155 |
| 2015/0281603 A1* | 10/2015 | Kim | ...................... | H04N 25/772 348/308 |
| 2017/0214868 A1* | 7/2017 | Yun | ...................... | H04N 25/75 |
| 2024/0188374 A1* | 6/2024 | Sheahan | ...................... | H10K 59/60 |

FOREIGN PATENT DOCUMENTS

| | | | |
|---|---|---|---|
| KR | 10-2018-0047710 A | | 5/2018 |
| KR | 10-2446289 B1 | | 9/2022 |

* cited by examiner

*Primary Examiner* — Jennifer D Bennett
(74) *Attorney, Agent, or Firm* — IP & T GROUP LLP

(57) ABSTRACT

A readout circuit and an image sensing device including the same are disclosed. The readout circuit includes a ramp signal generator configured to generate a ramp signal having first noise, a sampling circuit configured to generate a pixel sampling signal having second noise by sampling a pixel signal, and a conversion circuit configured to compare the ramp signal with the pixel sampling signal and offset the first noise and the second noise based on the comparison result.

17 Claims, 4 Drawing Sheets

READOUT CIRCUIT FOR REDUCING NOISE IN ANALOG-TO-DIGITAL CONVERTERS AND IMAGE SENSING DEVICE INCLUDING THE SAME

CROSS-REFERENCE TO RELATED APPLICATION

This patent application claims priority to, and the benefits of, Korean patent application No. 10-2023-0111033, filed on Aug. 24, 2023, which is hereby incorporated by reference in its entirety as part of this disclosure.

TECHNICAL FIELD

The technology and implementations disclosed in this present disclosure generally relate to a readout circuit and an image sensing device including the same.

BACKGROUND

An image sensor may include an analog-to-digital converter (ADC) that converts an analog signal output from a pixel array into a digital signal. The ADC may perform cross-correlated double sampling (CDS) on the analog output voltage serving as the output signal of the pixel array, and may store a voltage corresponding to the result of CDS. The ADC may compare the voltage stored by the CDS operation with a predetermined reference voltage in response to a ramp signal generated by a ramp signal generator, and may provide a comparison signal required to generate a digital code.

In the ramp signal generator, ramp power noise and ramp ground noise may occur. In this case, noise may be transmitted to a column ADC that receives the ramp signal as an input, thereby causing signal distortion.

SUMMARY

Various embodiments of the disclosed technology relate to a readout circuit capable of reducing the influence of power noise by offsetting noise to be generated in an input stage of an analog-to-digital converter (ADC), and an image sensing device including the same.

In accordance with an embodiment of the disclosed technology, a readout circuit may include a ramp signal generator configured to generate a ramp signal having first noise; a sampling circuit configured to generate a pixel sampling signal having second noise by sampling a pixel signal; and a conversion circuit configured to compare the ramp signal with the pixel sampling signal and offset the first noise and the second noise based on the comparison result.

In accordance with another embodiment of the disclosed technology, an image sensing device may include a source follower transistor configured to generate a pixel bias voltage corresponding to a pixel signal; a ramp signal generator configured to generate a ramp signal including first noise; a bias sampling circuit configured to generate a sampling voltage including second noise by sampling the pixel bias voltage; a buffer circuit configured to generate a pixel sampling signal by buffering the sampling voltage; and a conversion circuit configured to compare the ramp signal with the pixel sampling signal including the second noise to generate a digital signal based on a result of the comparison.

It is to be understood that both the foregoing general description and the following detailed description of the disclosed technology are illustrative and explanatory and are intended to provide further description of the invention as claimed. These and other features and advantages of the invention will become apparent from the detailed description of embodiments of the invention and the following figures.

BRIEF DESCRIPTION OF THE DRAWINGS

The above and other features and beneficial aspects of the disclosed technology will become readily apparent with reference to the following detailed description when considered in conjunction with the accompanying drawings.

DETAILED DESCRIPTION

Figure 1:
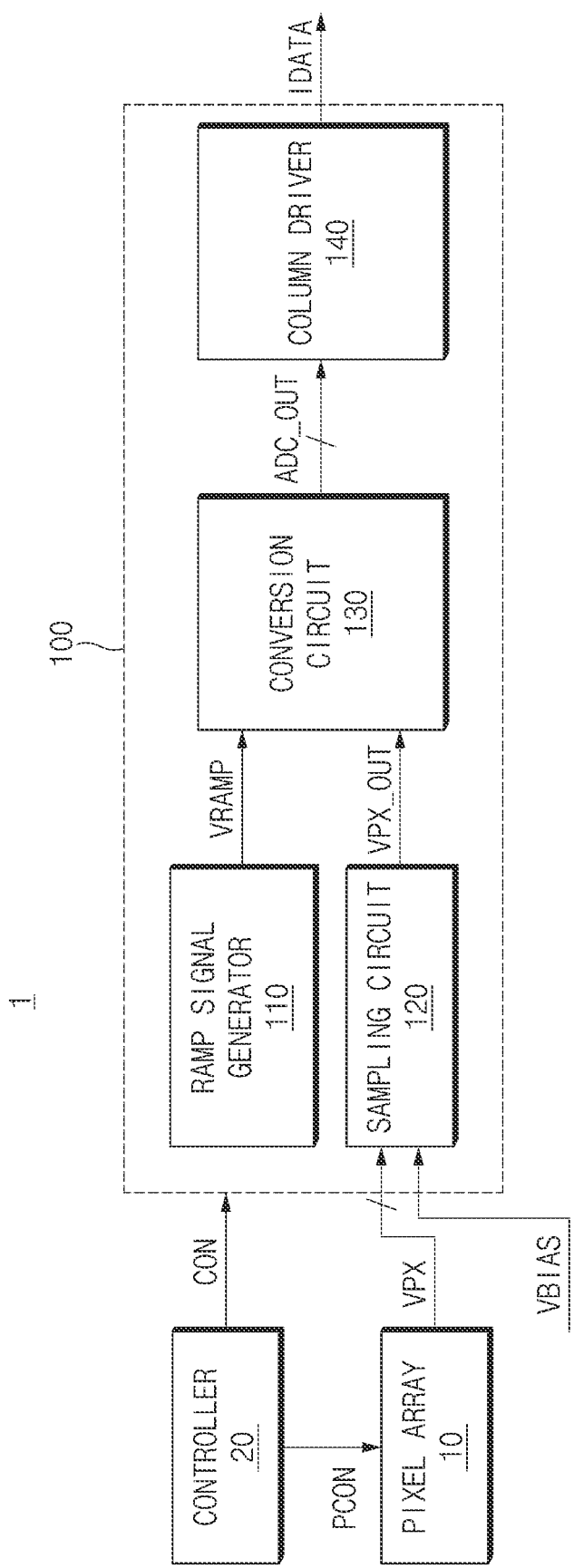
FIG. 1 is a block diagram illustrating an example of an image sensing device including a readout circuit based on some implementations of the disclosed technology.

The present disclosure provides implementations and examples of a readout circuit and an image sensing device including the same that may be used in configurations to substantially address one or more technical or engineering issues and to mitigate limitations or disadvantages encountered in some image sensing devices in the art. Some implementations of the disclosed technology relate to a readout circuit and an image sensing device including the same that can reduce the influence of power noise by offsetting noise to be generated in an input stage of an analog-to-digital converter (ADC). In recognition of the issues above, the readout circuit and the image sensing device including the same based on some implementations of the disclosed technology can reduce the influence of noise to be generated in the ADC, thereby preventing signal distortion from occurring in an image.

Reference will now be made in detail to some embodiments of the disclosed technology, examples of which are illustrated in the accompanying drawings. Wherever possible, the same reference numbers will be used throughout the drawings to refer to the same or like parts. While the disclosure is susceptible to various modifications and alternative forms, specific embodiments thereof are shown by way of example in the drawings. However, the disclosure should not be construed as being limited to the embodiments set forth herein.

Hereinafter, various embodiments will be described with reference to the accompanying drawings. However, it should be understood that the disclosed technology is not limited to specific embodiments, but includes various modifications, equivalents and/or alternatives of the embodiments. The embodiments of the disclosed technology may provide a variety of effects capable of being directly or indirectly recognized through the disclosed technology.

FIG. 1 is a block diagram illustrating an example of an image sensing device 1 including a readout circuit based on some implementations of the disclosed technology.

Referring to FIG. 1, the image sensing device 1 based on some implementations of the disclosed technology may include a pixel array 10, a controller 20, and a readout circuit 100.

The pixel array 10 may generate a pixel signal (VPX) in response to a pixel control signal (PCON) generated by the controller 20. The pixel array 10 may include a plurality of pixels disposed in an array which is arranged between a plurality of row lines and a plurality of column lines.

Each of the pixels may include a photoelectric conversion element that generates charges in response to incident light, for example, a photodiode, a phototransistor, a pinned photodiode, or the like. Each of the pixels may include a pixel circuit for generating a pixel signal. The pixel circuit may include a transfer transistor, a drive (source-follower) transistor, a selection transistor, and a reset transistor.

The controller 20 may generate the pixel control signal (PCON) to control the operation of the pixel array 10. In addition, the controller 20 may generate a control signal (CON) to control the operation of the readout circuit 100.

The readout circuit 100 may convert, into a digital signal, the pixel signal (VPX) generated from the pixel array 10 based on the control signal (CON), and may output image data (IDATA). As illustrated in FIG. 1, the readout circuit 100 may include a ramp signal generator 110, a sampling circuit 120, a conversion circuit 130, and a column driver 140.

The ramp signal generator 110 may generate a ramp signal (VRAMP) that changes with a slope of a predetermined magnitude based on the control signal (CON). In one embodiment, the ramp signal (VRAMP) may be a signal having a voltage level that periodically increases over time. In another embodiment, the ramp signal (VRAMP) may be a signal having a voltage level that periodically decreases over time.

The sampling circuit 120 may generate a sampling voltage by sampling the pixel signal (VPX) based on a bias voltage (VBIAS). The sampling circuit 120 may generate a pixel sampling signal (VPX_OUT) by adding sampling noise to the sampling voltage. In one embodiment, the bias voltage (VBIAS) may be a voltage generated by the controller 20.

The conversion circuit 130 may generate a digital signal (ADC_OUT) based on the ramp signal (VRAMP) and the pixel sampling signal (VPX_OUT). The image sensing device 1 may require an operation of converting, into a digital signal, an analog signal (e.g., a pixel signal VPX) output from the pixel array 10. For example, the conversion circuit 130 may compare the pixel sampling signal (VPX_OUT) with the ramp signal (VRAMP) and may output a digital signal (ADC_OUT) required to generate digital codes. In one embodiment, the conversion circuit 130 may include an analog-to-digital converter (ADC) that converts an analog signal into a digital signal.

The column driver 140 may output image data (IDATA) by processing the digital signal (ADC_OUT) received from the conversion circuit 130. The column driver 140 may include a latch or buffer capable of temporarily storing the digital signal (ADC_OUT). The image data (IDATA) output from the column driver 140 may be provided to a digital signal processor, etc.

In the readout circuit 100 having the above-described elements, the conversion circuit 130 may receive the ramp signal (VRAMP) and the pixel sampling signal (VPX_OUT) as input signals. However, when the ramp signal (VRAMP) with ramp noise is applied to the conversion circuit 130, signal distortion may occur. Accordingly, the sampling circuit 120 based on some implementations of the disclosed technology may add sampling noise to the pixel sampling signal (VPX_OUT) and may transmit the resultant pixel sampling signal (VPX_OUT) with sampling noise to the conversion circuit 130. The sampling circuit 120 may receive the pixel signal (VPX) from the pixel array 10 as an input and may add the sampling noise to the received signal. According to an embodiment of the disclosed technology, the ramp noise of the ramp signal (VRAMP) and the sampling noise of the pixel sampling signal (VPX_OUT) are offset from each other at the input terminal of the conversion circuit 130, thereby removing noise generated in the conversion circuit 130.

Figure 2:
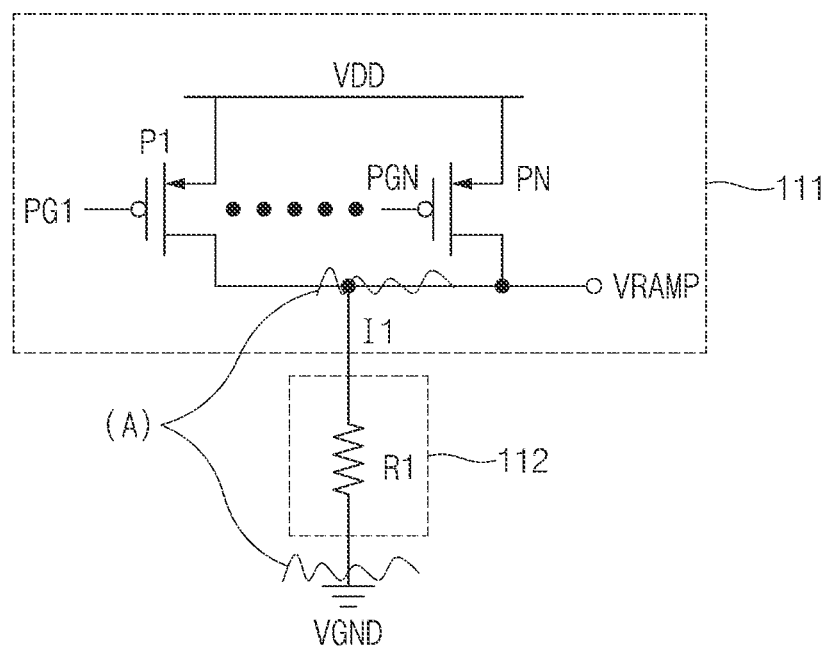
FIG. 2 is a detailed circuit diagram illustrating an example of a ramp signal generator shown in FIG. 1 based on some implementations of the disclosed technology.

FIG. 2 is a detailed circuit diagram illustrating an example of the ramp signal generator 110 shown in FIG. 1 based on some implementations of the disclosed technology.

Referring to FIG. 2, the ramp signal generator 110 may include a current generator 111 and a load circuit 112.

In the illustrated embodiment, the current generator 111 may be connected between a power-supply voltage (VDD) input terminal and the load circuit 112. The current generator 111 may generate a current (I1) that increases at a constant speed during an activation period in which the control signal (CON) is activated. The ramp signal generator 110 may output a ramp signal (VRAMP) from a node to which the load circuit 112 and the current generator 111 are connected.

The current generator 111 may include a plurality of transistors (P1~PN) that is connected between the power-supply voltage (VDD) input terminal and the load circuit 112 to respectively receive a plurality of current control signals (PG1~PGN) through gate terminals thereof. For example, the plurality of transistors (P1~PN) may include PMOS transistors. The current generator 111 may selectively open or close the plurality of transistors (P1~PN) based on the plurality of current control signals (PG1~PGN) and may thus adjust the magnitude of current (I1) flowing in the load circuit 112. In one embodiment, the plurality of current control signals (PG1~PGN) may be included in the control signal (CON).

The load circuit 112 may control loading of the ramp signal (VRAMP) and may output the result of such control. The load circuit 112 may include a resistor (R1) connected between the current generator 111 and a ground voltage (VGND) input terminal. In one embodiment, the resistor R1 may have a resistance value of a predetermined magnitude.

As such, the voltage of the ramp signal (VRAMP) in the ramp signal generator 110 may be determined based on values of the power-supply voltage (VDD), the ground voltage (VGND), the current (I1), and the resistor (R1). That is, the ramp signal generator 110 may generate a ramp signal (or ramp voltage) (VRAMP) based on the power-supply voltage (VDD) or the ground voltage (VGND).

However, in the ramp signal generator 110, power noise caused by the power-supply voltage (VDD) or ground noise caused by the ground voltage (VGND) may be included in the ramp signal (VRAMP), so that the resultant ramp signal (VRAMP) including power noise and ground noise can be output to the conversion circuit 130. In addition, noise generated by the ramp signal generator 110 itself may also be included in the ramp signal (VRAMP), so that the resultant ramp signal (VRAMP) with noise may be output to the conversion circuit 130.

As such, noise of the ramp signal (VRAMP) may include not only noise generated by the ramp signal generator 110 itself but also any one of power noise or ground noise, which will hereinafter be collectively referred to as ramp noise (i.e., first noise). In FIG. 2, the ramp noise (i.e., first noise) is illustrated by (A).

The ramp noise may increase horizontal noise in the image sensing device 1. That is, the ramp noise included in the ramp signal (VRAMP) of the ramp signal generator 110 may be transmitted to the input terminal of the conversion circuit 130 without change. When the ramp noise is transmitted to the input terminal of the conversion circuit 130, signal distortion may occur due to the ramp noise.

Figure 3:
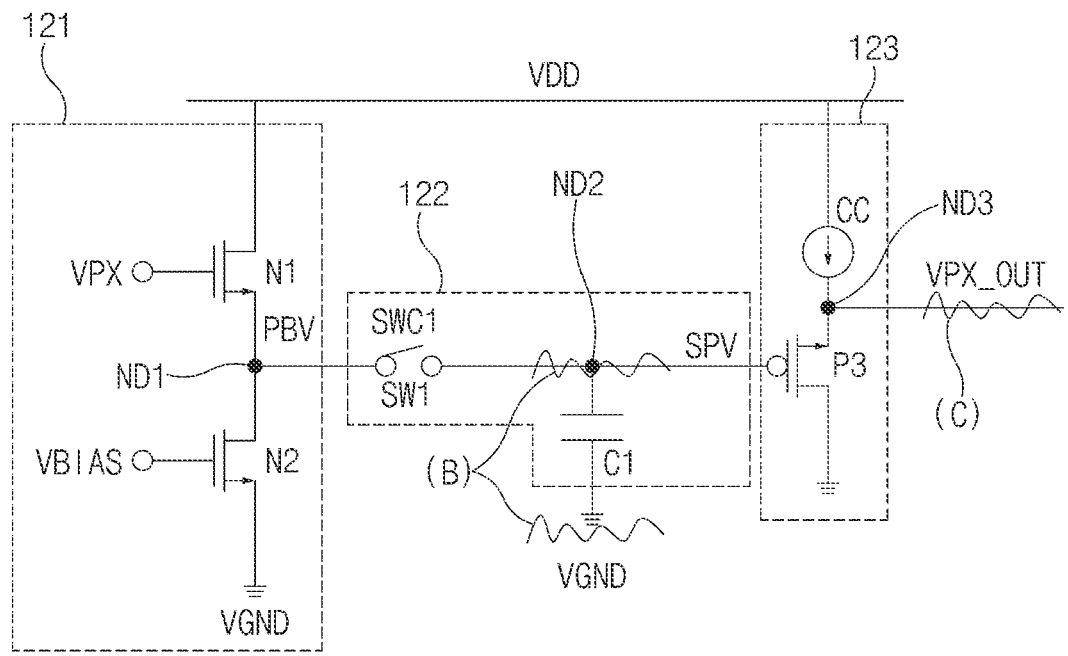
FIG. 3 is a detailed circuit diagram illustrating an example of a sampling circuit shown in FIG. 1 based on some implementations of the disclosed technology.

FIG. 3 is a detailed circuit diagram illustrating an example of the sampling circuit 120 shown in FIG. 1 based on some implementations of the disclosed technology.

Referring to FIG. 3, the sampling circuit 120 may include a source follower circuit 121, a bias sampling circuit 122, and a buffer circuit 123.

In one embodiment, the source follower circuit 121 may supply a pixel bias voltage (PBV) to the bias sampling circuit 122 based on a bias voltage (VBIAS). The pixel bias voltage (PBV) may correspond to the pixel signal (VPX) received from the pixel array 10.

The source follower circuit 121 may include a plurality of transistors (N1, N2). In one embodiment, the plurality of transistors (N1, N2) may be implemented as NMOS transistors.

In one embodiment, the transistor N1 (also referred to as "source follower transistor") may be connected between a power-supply voltage (VDD) input terminal and a node (ND1), so that the transistor N1 may receive the pixel signal (VPX) through a gate terminal thereof. Upon receiving the pixel signal (VPX), the transistor N1 may supply to the node ND1 the pixel bias voltage (PBV) corresponding to a gate-source voltage. The transistor N1 may be included in the pixel array 10 shown in FIG. 1, but the scope or spirit of the disclosed technology is not limited thereto. The following embodiment of the disclosed technology illustrates that the transistor N1 is included in the source follower circuit 121 of FIG. 3.

In one embodiment, the transistor N2 (also referred to as "bias transistor") may be connected between the node (ND1) and the ground voltage (VGND) input terminal, so that the transistor N2 may receive the bias voltage (VBIAS) through a gate terminal thereof. The transistor N2 may bias the voltage of the node (ND1) based on the bias voltage (VBIAS). Upon receiving the bias voltage (VBIAS), the transistor N2 may supply to the node (ND1) the pixel bias voltage (PBV) corresponding to a gate-source voltage.

The pixel bias voltage (PBV) output to the node ND1 may correspond to a value obtained by subtracting the gate-source voltage of the transistor N1 from the voltage of the pixel signal (VPX). That is, when the current flowing through the transistors (N1, N2) is constant, the pixel bias voltage (PBV) corresponds to the gate-source voltages of the transistors (N1, N2), so that the pixel bias voltage (PBV) may not be affected by ground noise. Accordingly, the sampling circuit 120 based on some implementations of the disclosed technology may randomly generate ground noise by the bias sampling circuit 122 to be described later and may transmit the ground noise to the buffer circuit 123.

The bias sampling circuit 122 may sample the pixel bias voltage (PBV) of the node (ND1) and may transmit the sampling voltage (SPV) to the buffer circuit 123. When the bias sampling circuit 122 transmits the sampling voltage (SPV) to the buffer circuit 123, sampling noise (ground noise) caused by the ground voltage (VGND) may also be transmitted to the buffer circuit 123.

The bias sampling circuit 122 may include a sampling switch (SW1) and a sampling capacitor (C1). The sampling switch (SW1) may be connected between the node (ND1) and the node (ND2) so that the switching operation can be controlled by a switching control signal (SWC1). In one embodiment, the switching control signal (SWC1) may be included in the control signal (CON) described above. The sampling capacitor C1 may be connected between the node (ND2) and the ground voltage (VGND) input terminal.

In the bias sampling circuit 122, when the switching control signal (SWC1) is activated and the sampling switch (SW1) is turned on (connected), the pixel bias voltage (PBV) of the node (ND1) may be transferred to the buffer circuit 123 without change.

When the switching control signal (SWC1) is deactivated and the sampling switch (SW1) transitions from the ON state to the OFF state (off-circuit), the voltage level of the node (ND2) may increase by the sampling capacitor (C1). That is, when the sampling switch SW1 is turned off, sampling noise caused by the ground voltage (VGND) may be transferred to the node (ND2) through the sampling capacitor (C1). Accordingly, as shown in (B) of FIG. 3, the sampling voltage (SPV) in which sampling noise is added to the pixel bias voltage (PBV) applied to the node (ND2) may be transmitted to the buffer circuit 123.

Figure 4:
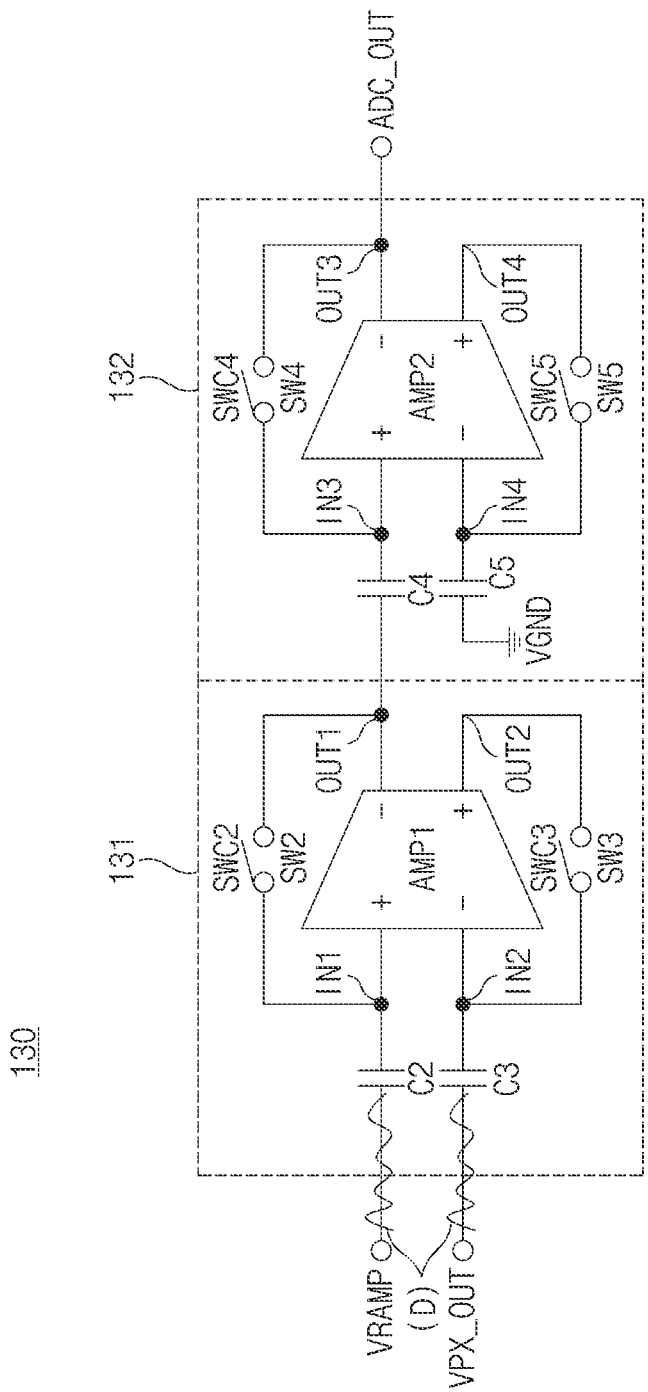
FIG. 4 is a detailed circuit diagram illustrating an example of a conversion circuit shown in FIG. 1 based on some implementations of the disclosed technology.

In one embodiment, the buffer circuit 123 may generate a pixel sampling signal (VPX_OUT) based on the sampling voltage (SPV) of the bias sampling circuit 122 and may output the pixel sampling signal (VPX_OUT) to the conversion circuit 130. The conversion circuit 130 to be described later may include capacitors (C2, C3) at an input terminal thereof, as shown in FIG. 4. Accordingly, the buffer circuit 123 may provide the conversion circuit 130 with the pixel sampling signal (VPX_OUT) buffered with the sampling voltage (SPV), thereby preventing coupling noise from being generated by the capacitors (C2, C3). The buffer circuit 123 may include a constant current source (CC) and a transistor (P3).

In one embodiment, the constant current source (CC) may be connected between the power-supply voltage (VDD) input terminal and the node (ND3). The constant current source (CC) may supply a constant current to the node (ND3).

The transistor P3 (also referred to as "load transistor") may be connected between the node (ND3) and the ground voltage terminal, so that the transistor P3 may be connected to the node (ND2) through a gate terminal thereof. The transistor P3 may be implemented as a PMOS transistor. The transistor P3 may provide the conversion circuit 130 with the pixel sampling signal (VPX_OUT) corresponding to the gate-source voltage based on the output voltage of the node (ND2).

For example, the transistor P3 may be turned off when the sampling voltage (SPV) is at a high level. When the sampling voltage (SPV) is at a low level, the transistor P3 may be turned on and may thus output the pixel sampling signal (VPX_OUT) at a low level. When the current of the constant current source CC is constant, the transistor P3 may output the pixel sampling signal (VPX_OUT) as a voltage value corresponding to the gate-source voltage. That is, since the pixel sampling signal (VPX_OUT) corresponds to the gate-source voltage of the transistor P3, noise (referred to as "sampling noise", i.e., second noise) added to the sampling voltage (SPV) in the bias sampling circuit 122 may be transmitted to the pixel sampling signal (VPX_OUT) as shown in (C) of FIG. 3.

FIG. 4 is a detailed circuit diagram illustrating an example of the conversion circuit 130 shown in FIG. 1 based on some implementations of the disclosed technology.

Referring to FIG. 4, the conversion circuit 130 may include a first comparison block 131 and a second comparison block 132. In some embodiments, the conversion circuit 130 includes two comparison blocks 131 and 132. However, the scope or spirit of the embodiment of the disclosed technology is not limited thereto. Alternatively, each of the comparison blocks may be comprised of one stage or three or more stages.

In one embodiment, the first comparison block 131 may compare the ramp signal (VRAMP) with the pixel sampling signal (VPX_OUT), and may output a comparison signal corresponding to the result of comparison. The first comparison block 131 may include a plurality of capacitors (C2, C3), a plurality of switching elements (SW2, SW3), and a comparator (AMP1).

The capacitor C2 may be connected to the ramp signal generator 110 and may receive the ramp signal (VRAMP). The capacitor C2 may be connected between the input terminal of the ramp signal (VRAMP) and the first input terminal (IN1) of the comparator (AMP1).

The capacitor C2 may correct an offset of the comparator (AMP1) and a change in the ramp level. For example, the capacitor C2 may perform direct current (DC) blocking on the received ramp signal (VRAMP) and may output the resultant signal to the comparator (AMP1). Here, the expression "DC blocking" may mean an operation of removing DC components of signals.

The capacitor C3 may be connected to the sampling circuit 120 and may receive the pixel sampling signal (VPX_OUT). The capacitor C3 may be connected between the input terminal of the pixel sampling signal (VPX_OUT) and the second input terminal (IN2) of the comparator (AMP1).

The capacitor C3 may correct an offset of the comparator (AMP1) and a change in the pixel reset level. For example, the capacitor C3 may perform DC blocking on the received pixel sampling signal (VPX_OUT) and may output the resultant signal to the comparator (AMP1).

The switching element SW2 may be connected between the first input terminal (IN1) of the comparator (AMP1) and the first output terminal (OUT1) of the comparator (AMP1). The switching operation of the switching element SW2 may be controlled by a switching control signal (SWC2). For example, when the switching element (SW2) is turned on and the first input terminal (IN1) of the comparator (AMP1) is connected to the first output terminal (OUT1), the capacitor C2 and the comparison signal may have the same level, so that the offset of the comparator (AMP1) can be removed.

The switching element SW3 may be connected between the second input terminal (IN2) of the comparator (AMP1) and the second output terminal (OUT2) of the comparator (AMP1). The switching operation of the switching element SW3 may be controlled by the switching control signal (SWC3).

The comparator (AMP1) may include a differential-type operational amplifier (OP-AMP) with a 2-input terminal (IN1, IN2)/2-output terminal (OUT1, OUT2) structure. For example, the comparator (AMP1) may compare a ramp signal (VRAMP) applied to the first input terminal (IN1) through the capacitor C2 with a pixel sampling signal (VPX_OUT) applied to the second input terminal (IN2) through the capacitor C3 and may output a comparison signal corresponding to the result of comparison to the first output terminal (OUT1).

The second comparison block 132 may compare the comparison signal received from the first comparison block 131 with the ground voltage (VGND) and may output a digital signal (ADC_OUT) corresponding to the result of comparison. The second comparison block 132 may include a plurality of capacitors (C4, C5), a plurality of switching elements (SW4, SW5), and a comparator (AMP2).

The capacitor C4 may be connected between the first output terminal (OUT1) of the comparator (AMP1) and the third input terminal (IN3) of the comparator (AMP2). The capacitor C5 may be connected between the ground voltage (VGND) input terminal and the fourth input terminal (IN4) of the comparator (AMP2).

The switching element SW4 may be connected between the third input terminal (IN3) of the comparator (AMP2) and the third output terminal (OUT3) of the comparator (AMP2). The switching operation of the switching element (SW4) may be controlled by the switching control signal (SWC4). When the switching element SW4 is turned on and the third input terminal (IN3) of the comparator (AMP2) is connected to the third output terminal (OUT3), the output signals of the capacitor C4 and the comparator (AMP2) may have the same level, so that the offset of the comparator (AMP2) can be removed.

The switching element SW5 may be connected between the fourth input terminal (IN4) of the comparator (AMP2) and the fourth output terminal (OUT4) of the comparator (AMP2). The switching operation of the switching element SW5 may be controlled by the switching control signal (SWC5).

The comparator (AMP2) may include a differential-type operational amplifier (OP-AMP) with a 2-input terminal (IN3, IN4)/2-output terminal (OUT3, OUT4) structure. For example, the comparator (AMP2) may compare a comparison signal applied to the third input terminal (IN3) through the capacitor C4 with the ground voltage (VGND) applied to the fourth input terminal (IN4) through the capacitor C5 and may output a digital signal (ADC_OUT) corresponding to the result of comparison to the third output terminal (OUT3).

The above-described switching control signals (SWC2~SWC5) may be signals included in the control signal (CON) shown in FIG. 1. For example, the controller 20 may generate switching control signals (SWC2~SWC5) to control the switching operations of the switching elements (SW2~SW5) included in the comparison blocks (131, 132).

For example, the controller 20 may selectively activate the switching control signals (SWC2~SWC5) to perform an auto-zeroing operation in an auto-zero period. In addition, the controller 20 may selectively activate the switching control signals (SWC2~SWC5) to perform a comparison operation in a comparison operation period. In one embodiment, the switching control signals (SWC2~SWC5) may have the same phase. Alternatively, the switching control signals (SWC2~SWC5) may be signals having opposite phases or may be signals having different phases.

In the conversion circuit 130 having the above-described elements, the input terminal of the capacitor C2 may be connected to the output terminal of the ramp signal generator 110, so that ramp noise included in the ramp signal (VRAMP) may be input to one terminal of the capacitor C2 without change. In addition, since the input terminal of the capacitor C3 in the conversion circuit 130 is connected to the output terminal of the sampling circuit 120, sampling noise included in the pixel sampling signal (VPX_OUT) may be input to one terminal of the capacitor C3 without change. In this case, as shown in (D) of FIG. 4, when the first comparison block 121 performs a differential operation, ramp noise and sampling noise may be offset from each other.

That is, as described in FIG. 2 above, when ramp noise is transmitted to one terminal (i.e., the input terminal of the capacitor C2) of the conversion circuit 130, signal distortion may occur due to the ramp noise. According to an embodiment of the disclosed technology, sampling noise may be generated by the sampling circuit 120 and transmitted to the other terminal (i.e., the input terminal of the capacitor C3) of the conversion circuit 130, so that noise levels of the two input terminals of the conversion circuit 130 can be maintained at the same level, thereby offsetting noise to be input to the conversion circuit 130.

According to an embodiment of the disclosed technology, when ground noise is added to the ramp signal (VRAMP) of the ramp signal generator 110, the sampling circuit 120 may sample the ground noise and add the sampled result to the pixel sampling signal (VPX_OUT). However, the scope or spirit of the embodiment of the disclosed technology is not limited thereto, and as another example, when power noise is added to the ramp signal (VRAMP) of the ramp signal generator 110, the sampling circuit 120 may add power noise to the pixel sampling signal (VPX_OUT) as needed.

As is apparent from the above description, the readout circuit and the image sensing device including the same based on some implementations of the disclosed technology can reduce the influence of noise to be generated in the ADC, thereby preventing signal distortion from occurring in an image.

The embodiments of the disclosed technology may provide a variety of effects capable of being directly or indirectly recognized through the present disclosure.

Although a number of illustrative embodiments have been described, it should be understood that modifications and enhancements to the disclosed embodiments and other embodiments can be devised based on what is described and/or illustrated in the present disclosure. Furthermore, the embodiments may be combined to form additional embodiments.

What is claimed is:

1. A readout circuit comprising:
a ramp signal generator configured to generate a ramp signal having first noise;
a sampling circuit configured to generate a pixel sampling signal having second noise by sampling a pixel signal; and
a conversion circuit configured to compare the ramp signal with the pixel sampling signal and offset the first noise and the second noise based on a result of the comparison,
wherein the sampling circuit includes:
a source follower circuit configured to generate a pixel bias voltage corresponding to the pixel signal based on a bias voltage;
a bias sampling circuit configured to sample the pixel bias voltage and generate a sampling voltage to which the second noise is added; and
a buffer circuit configured to generate the pixel sampling signal based on the sampling voltage,
wherein the bias sampling circuit includes:
a sampling switch connected between an input terminal for receiving the pixel bias voltage and a third node to control a switching operation by a first switching control signal; and
a sampling capacitor connected between the third node and a ground voltage input terminal.

2. The readout circuit according to claim 1, wherein the ramp signal generator includes:
a current generator configured to generate a current based on a control signal; and
a load circuit configured to control loading of the current generator,
wherein the ramp signal generator outputs the ramp signal to a first node to which the current generator and the load circuit are connected.

3. The readout circuit according to claim 2, wherein the current generator includes:
a plurality of transistors connected to the load circuit and a power-supply voltage input terminal and configured to be selectively opened or closed based on the control signal.

4. The readout circuit according to claim 2, wherein the load circuit includes:
a resistor connected between the first node and a ground voltage input terminal.

5. The readout circuit according to claim 4, wherein the ramp signal generator is configured to add the first noise generated from the ground voltage input terminal to the ramp signal through the resistor.

6. The readout circuit according to claim 1, wherein the source follower circuit includes:
a source follower transistor connected between a power-supply voltage input terminal and a second node, and configured to receive the pixel signal through a gate terminal thereof; and
a bias transistor connected between the second node and a ground voltage input terminal, and configured to receive the bias voltage through a gate terminal thereof,
wherein the source follower circuit is configured to output the pixel bias voltage through the second node.

7. The readout circuit according to claim 1, wherein the bias sampling circuit is configured to:
transmit the pixel bias voltage to the buffer circuit when the sampling switch is turned on based on the first switching control signal; and
add, by the sampling capacitor, the second noise to the sampling voltage when the sampling switch is turned off based on the first switching control signal.

8. The readout circuit according to claim 1, wherein the buffer circuit includes:
a constant current source connected between a power-supply voltage input terminal and a fourth node; and
a load transistor connected between the fourth node and a ground voltage input terminal to receive the sampling voltage through a gate terminal thereof.

9. The readout circuit according to claim 1, wherein the conversion circuit includes:
an analog-to-digital converter ADC configured to compare the ramp signal with the pixel sampling signal and generate a digital signal based on a result of the comparison.

10. The readout circuit according to claim 1, wherein the conversion circuit includes:
a first comparison block configured to compare the ramp signal including the first noise with the pixel sampling signal including the second noise.

11. The readout circuit according to claim 10, wherein the first comparison block further includes:
a first capacitor connected between an input terminal for receiving the ramp signal and a first input terminal;
a second capacitor connected between an input terminal for the pixel sampling signal and a second input terminal; and
a first comparator configured to generate a comparison signal by comparing a signal on the first input terminal with a signal on the second input terminal.

12. The readout circuit according to claim 11, wherein the first comparison block further includes:

a first switching element connected between the first input terminal and a first output terminal of the first comparator to control a switching operation by a second switching control signal; and a second switching element connected between the second input terminal and a second output terminal of the first comparator to control a switching operation by a third switching control signal.

13. The readout circuit according to claim 10, wherein the conversion circuit further includes:

a second comparison block configured to compare an output signal of the first comparison block with a ground voltage and generate a digital signal based on a result of the comparison.

14. The readout circuit according to claim 13, wherein the second comparison block includes:

a third capacitor connected between a first output terminal of the first comparison block and a third input terminal;

a fourth capacitor connected between a ground voltage input terminal and a fourth input terminal; and a second comparator configured to generate the digital signal by comparing a signal on the third input terminal with a signal on the fourth input terminal.

15. The readout circuit according to claim 14, wherein the second comparison block further includes:

a third switching element connected between the third input terminal and a third output terminal of the second comparator to control a switching operation by a fourth switching control signal; and a fourth switching element connected between the fourth input terminal and a fourth output terminal of the second comparator to control a switching operation by a fifth switching control signal.

16. An image sensing device comprising:

a source follower transistor configured to generate a pixel bias voltage corresponding to a pixel signal;

a ramp signal generator configured to generate a ramp signal including first noise;

a bias sampling circuit configured to generate a sampling voltage including second noise by sampling the pixel bias voltage;

a buffer circuit configured to generate a pixel sampling signal by buffering the sampling voltage; and a conversion circuit configured to compare the ramp signal with the pixel sampling signal including the second noise to generate a digital signal based on a result of the comparison, wherein the bias sampling circuit includes:

a sampling switch connected between an input terminal for receiving the pixel bias voltage and a first node to control a switching operation by a switching control signal; and a sampling capacitor connected between the first node and a ground voltage input terminal.

17. The image sensing device according to claim 16, wherein the conversion circuit is configured to:

receive the ramp signal including the first noise through a first input terminal;

receive the pixel sampling signal including the second noise through a second input terminal; and compare the ramp signal with the pixel sampling signal, thereby offsetting the first noise and the second noise by the result of the comparison.

* * * * *